Patented Dec. 14, 1937

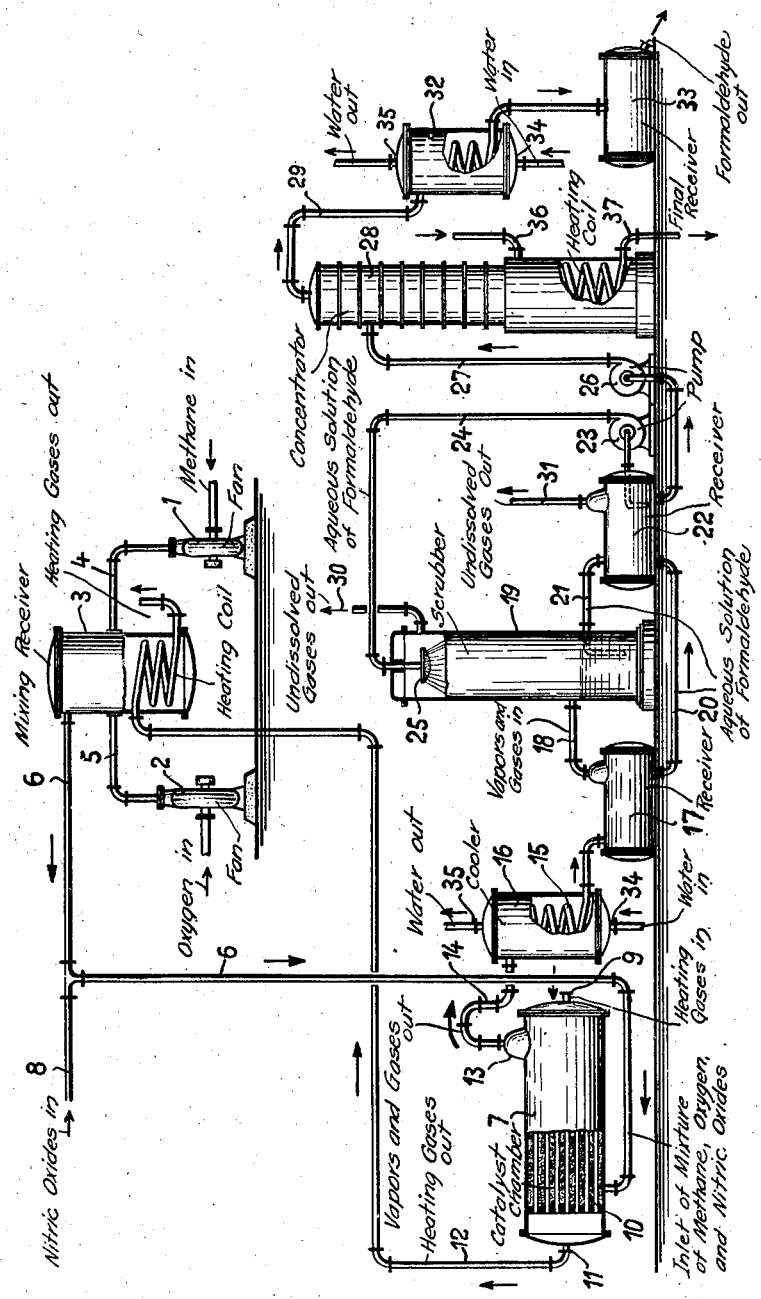

2,102,160

UNITED STATES PATENT OFFICE 2,102,160

PROCESS FOR THE PRODUCTION OF FORMALDEHYDE FROM METHANE

Paul Nashan, Oberhausen, Germany, assignor to the firm Gutehoffnungshutte Oberhausen Aktiengesellschaft, Oberhausen - Rheinland, Germany Application March 15, 1934, Serial No. 715,697
In Germany March 15, 1933

1 Claim. (Cl. 260—138)

Processes have become known which have the object of oxidizing methane into formaldehyde. Also the attempt has been made to obtain an oxidation of the methane into formaldehyde from a mixture consisting of one part by volume of methane or some other gas containing the same quantity of methane, two parts by volume of nitric oxide and a sufficient quantity of oxygen or air by oxidizing the nitric oxide and by repeatedly reducing this portion of the gas. By another process formaldehyde, although a small quantity only, is obtained by nitric oxides being used as catalysts. According to this process air is passed over nitric acid and is heated to a temperature of 250 to 560 centigrades together with methane and the nitric oxides carried with it, as it is passed over the nitric acid, these oxides taking part with a percentage by weight of 1–2. Besides the nitric oxides, no other catalysts are resorted to. But none of these processes has been known to have resulted in a production of formaldehyde on commercial lines.

The present process makes it possible to oxidize methane into formaldehyde so as to obtain a commercially satisfactory yield. This process consists in passing through a catalyst chamber at a temperature of 600 to 750 centigrades and over solid catalysts contained in said chamber the reaction mixture composed of methane or of a gas containing methane and of a gas containing oxygen, such as air for instance, together with a quantity of less than one per cent of nitric oxides, calculated as NO, serving as gaseous catalysts. The hot solid catalysts consist of oxides of alkaline earth elements included in the second group of the Periodic series, in admixture with a catalyst of the type which, if used alone, has the property of accelerating oxidation; viz., an oxide of aluminum, tungsten, manganese, nickel, chromium, vanadium, molybdenum or cobalt. The materials may be used in the form of their oxides or carbonates; the carbonates changing to the oxides when hot and in contact with air. Or, alloys of the metal or their mutual compounds may be used; these in turn being superficially converted into oxides by the hot gases. My mixture of solid catalysts has the remarkable characteristic of stopping the oxidation of methane at the point desired; the production of formaldehyde. The nitric oxides act as oxidation catalysts to accelerate the action of binding oxygen to methane. The oxidation, however, has a strong tendency to develop rather rapidly, beyond the oxidation stage for formaldehyde, into that of higher oxidation compounds, as $CO+H_2$ and $CO_2$ and $CO_2+H_2O$, and this is the reason why oxidation has to be stopped; all the more since the heat produced at every stage of oxidation raises the temperature existing in the reaction chamber in a short time beyond the ignition point of the whole mixture which would cause complete combustion provided that a sufficient quantity of oxygen were present. In my process the only catalysts promoting oxidation are the nitric oxides. The solid catalyst mixture is adapted to control oxidation; to prevent oxidation going on beyond the stage desired.

With the aid of the accompanying drawing illustrating diagrammatically by way of example an equipment suitable for carrying out the process, the steps of the present process and the manner in which it is practiced, are set forth explicitly.

Element 1 represents a pump or fan aspiring the methane or gases containing methane, 2 is a pump or fan aspiring oxygen or gases containing oxygen, e. g. air. These two pumps deliver the two reaction bodies through the pipes 4 and 5 into the mixing receiver 3. The reaction mixture leaves the mixing receiver 3 through the pipe 6 to enter the catalyst chamber 7, after it has taken up previously through the pipe 8 the nitric oxides which shall act as oxidation catalysts. As catalyst chamber 7 a multitubular vessel of heating tubes has been adopted which is heated at 9, or which is entered by the heating gases at this point. The heating gases pass through the interior of the tubes 10 and leave the vessel at 11 through pipe 12. The remnant heat can be given off in the mixer 3 or in any other apparatus. The space in the interior of the catalyst chamber entered by the reaction mixture holds the solid catalysts. The formaldehyde leaves the catalyst chamber together with the remnant gas at 13 and passes through the piping 14 and pipe coil 15 and through the cooler 16 into the receiver 17. Out of this receiver the vapors and gases flow through the pipe 18 into the scrubber 19. The products of condensation collected in the receiver 17 run through the pipe 20 and those from the scrubber 19 through the pipe 21 into the receiver 22 wherefrom the aqueous solution is returned by pump 23 through pipe 24 and through the sprinkler 25 to the scrubber or is delivered by pump 26 into the concentrator 28. The scrubber 19 is an apparatus well-known in itself equipped with baffle plates or some other suitable means, in which the aqueous solution of formaldehyde aspired by pump 26 and forced through the pipe 27 is concentrated so as to obtain a marketable product. The portions which cannot be condensed in the scrubber flow off through the discharge pipe 30, while any undissolved gases collecting in the receiver 22 escape through the vent pipe 31. The product obtained passes from 28 through pipe 29 and through the cooler 32 into the receiver 33. As cooling agent for the coolers 16 and 32 preferably water is used which enters at 34 and leaves at 35. The heating vapors of the concentrator 28 pass at 36 into the pipe coil and are discharged at 37.

The gas mixture consisting of methane and oxygen or of the gases containing these constituents and entering the catalyst chamber 7 will be heated, together with nitric oxides acting as gaseous catalysts, in this catalyst chamber to a temperature of 600–750 centigrades. The reaction components react with another under the action of the solid catalysts which stop oxidation at the formaldehyde stage and are further treated in the usual well-known manner as already set forth above, so as to make it possible to withdraw it from 33 as a marketable formaldehyde solution.

By the use of the solid catalysts in the catalyst chamber it has been made possible to increase the yields obtained to the quantities stated in the following examples:

Example 1

In the catalyst chamber 7 a mixture consisting of 60% $MgO$+25% $SiO_2$+15% $ZnO$ was used as solid catalysts. Gas having a percentage of methane of 50 was used as reaction gas, while the oxidizing agent employed was air. As gaseous catalyst $NO$ was made use of in a quantity amounting to 0.3% by volume, referred to the whole reaction mixture. At a working temperature of 720 centigrades a yield of 93 grams of HCHO was obtained per each cubic metre of methane.

Example 2

Catalyst: 95% $SiO_2$+4% $CaO$+1% $Na_2CO_3$
Reaction gas: gas containing 50% $CH_4$
    =168 litres/h.
Oxidizing agent: air    =1000 litres/h.
Gaseous catalyst: NO    =2.9 litres/h.=
    0.25 by volume
Working temperature:    =715 centigrades
Yield: =112.0 grams of HCHO per cub. m. of $CH_4$

Example 3

Catalyst: 40% $Al_2O_3$+20% $MgO$+5% $CaO$+ 2% $Fe_2O_3$+20% $SiO_2$+10% $MoO_3$+3% $CrO_3$
Reaction gas: gas containing 50% $CH_4$
    =168 litres/h.
Oxidizing agent: air    =1000 litres/h.
Gaseous catalyst: NO    =2.9 litres/h.=
    0.25 by volume
Working temperature:    =720 centigrades
Yield: =98.5 grams of HCHO per cub. m. of $CH_4$

Example 4

Catalyst: 52% $BaO$+12% $CaCO_3$+ 5% $CoO$+20% $ZrO_2$+11% $MgCO_3$
Reaction gas: gas containing 25% $CH_4$
    =500 litres/h.
Oxidizing agent: air    =3000 litres/h.
Gaseous catalyst: NO    =4.5 litres/h.=
    0.15% by volume
Working temperature:    =725 centigrades
Yield: =186.0 grams of HCHO per cub. m. of $CH_4$

Example 5

Catalyst: 25% $TiO_2$+20% $SrO$+5% $PbO$+ 35% $ZnO$+12% $NiO_2$+3% $AlO_3$
Reaction gas: gas containing 50% $CH_4$
    =200 litres/h.
Oxidizing agent: air    =1400 litres/h.
Gaseous catalyst: NO    =6.4 litres/h.=
    0.4% by volume
Working temperature:    =675 centigrades
Yield: =125 grams of HCHO per cub. m. of $CH_4$

Example 6

Catalyst: 50% of $MgCO_3$+40% $Al_2O_3$+ 5% $CdO$+5% $CeO_2$
Reaction gas: gas containing 50% $CH_4$
    =200 litres/h.
Oxidizing agent: air    =1600 litres/h.
Gaseous catalyst: NO    =8.1 litres/h.=
    0.45% by volume
Working temperature:    =680 centigrades
Yield: =142.0 grams of HCHO per cub. m. of $CH_4$

What I claim is:

In the production of formaldehyde from methane by the action of oxygen, the process which comprises passing a gaseous reaction mixture containing methane and oxygen together with nitrogen oxides in amount less than 1 per cent by volume, calculated as NO, serving as gaseous catalysts, at a temperature of 600° to 700° C., over a hot oxidation-controlling catalyst mixture comprising an alkaline earth metal oxide in conjunction with a metal oxide catalyst which, when used alone, accelerates oxidation of methane, said mixture serving to prevent substantial oxidation of the formaldehyde into undesirable products at the stated high temperature, and recovering formaldehyde from the effluent gases.

PAUL NASHAN.